Figure 1:
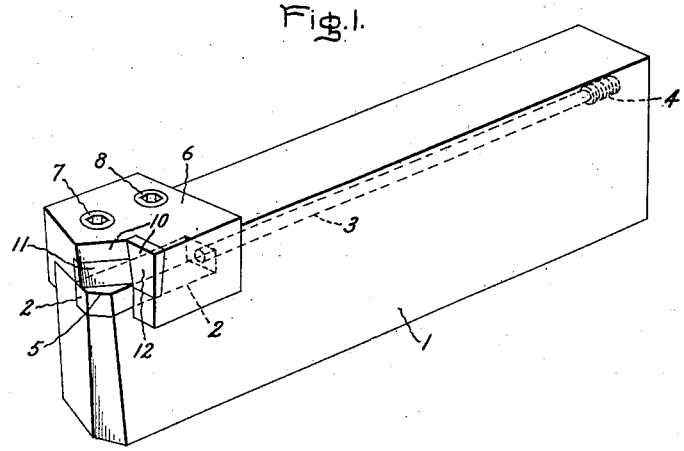

July 18, 1939.  N. N. SHEPHERD  2,166,826

CHIP CONTROLLER AND BREAKER

Filed Dec. 10, 1936

Inventor:
Noble N. Shepherd,
by Harry E. Dunham
His Attorney.

Patented July 18, 1939

2,166,826

UNITED STATES PATENT OFFICE 2,166,826

CHIP CONTROLLER AND BREAKER

Noble N. Shepherd, Detroit, Mich., assignor to Carboloy Company, Inc., a corporation of New York Application December 10, 1936, Serial No. 115,157

7 Claims. (Cl. 29—96)

The present invention relates to metal cutting tools but more particularly to a chip controller and breaker adapted to be employed with such tools. When cemented carbide tools are employed in cutting steel and like material the chip as it comes from the work is very hot and often very long and unless broken into relatively short lengths as it comes from the work, constitutes an element of danger.

One of the objects of the present invention is to provide a chip controller and breaker which may be mounted on the tool and which will control the curling of the chip and also break it into relatively small pieces. Other objects will appear hereinafter.

The novel features which are characteristic of my invention are set forth with particularity in the appended claims. My invention itself however will best be understood from reference to the following specification when considered in connection with the accompanying drawing in which Fig. 1 is a perspective view of a tool and chip controller and breaker embodying the features of my invention, while Fig. 2 is a view in elevation of the front portion of the tool and chip controller and breaker disclosed in Fig. 1.

Referring more particularly to the drawing, I have indicated at 1 a steel tool shank or holder provided with a recess in which a tool tip 2 is positioned. The shank has a longitudinal hole drilled therein in which a pin 3 is mounted. The pin 3 abuts the end of tip 2 and is adapted to be moved in a longitudinal direction by a screw 4 to thereby adjust the position of the tip on the shank 1. The tip is cut away slightly at its forward end to form what is known as the cutting angle of the tip, i. e. the angle formed between line 5 and the work. In Fig. 1 this angle is about 45°.

The tip 2 is held in position on shank 1 by a steel chip controller and breaker 6. The latter is provided with a channelled portion which fits snugly over and embraces the shank and tip, as clearly indicated in Figs. 1 and 2. Two screws 7 and 8, which engage screw threads 9 in the shank 1, hold the breaker 6 securely in position against the shank and tool tip. The chip controller and breaker is provided with countersunk portions within which the heads of the screws 7 and 8 are seated. After the chip controller and breaker 6 has been clamped in position on the shank and tip by tightening the screws 7 and 8, the tip 2 may be moved in a forward direction by means of the screw 4 and rod 3. Of course, if desired, the tip may be adjusted by loosening screws 7 and 8 and thereafter adjusting the screw 4.

Figure 2:
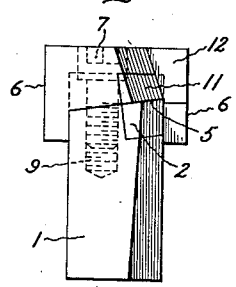

The front or forward end of the chip controller and breaker 6 has an angular hard metal face 10 provided with two hard metal plates 11 and 12 which form with each other an angle greater than 90° but less than 180° and as indicated on Fig. 1 about 120°. Plate 11 forms an angle slightly greater than 90° with the top surface of tip 2, while plate 12 is substantially at right angles with the tip and top surface of the shank. Each plate is rigidly secured to the controller and breaker 6 by copper brazing. Plate 11 curls the chip as it comes from the work and also controls the tightness of the curl. Plate 12 is so positioned with respect to the work that the chip striking against it is relatively cold and brittle and will break easily at the cutting edge of the tool.

The line 5, when extended, forms an angle with the base line of plate 11, i. e. the line in which the plate intersects the surface of tool bit 2. In the present illustration this angle is about 15° which is suitable for a thin chip. The tightness of the chip curl may be controlled by varying this angle. The size of the angle may be determined originally by the type of work to be performed but may be varied if desired by grinding the surface of plate 11.

Plates 11 and 12 and tool tip 2 may be made of any suitable hard metal but preferably consist of a sintered composition containing one or more hard metal carbides bonded or cemented with lower melting point auxiliary metal. Compositions of this type are commonly known as cemented carbides. An example of such a composition is disclosed in Schroter Reissue Patent 17,624.

To assemble the tool the tip 2 is first placed in the recess of the holder or shank 1. The chip breaker 6 is then positioned over the tip and the screws 7 and 8 adjusted to hold the tip fairly tight on the shank. The assembled tool is then placed in a tip locating fixture so that the back of the chip breaker 6 is tight against a locating block. A thumb screw in the block is then adjusted to hold the assembled tool securely in position. The locating block has an indicator rigidly secured thereto and comprises a fixed dial and movable pointer. The latter is adapted to be actuated by a plunger positioned in front of and in alignment with the tip 2. The tip 2 is now adjusted longitudinally by means of screw 4 until the cutting point of the tool actuates the plunger to thereby move the pointer to a definite position, for example the zero position on the indicator.

When the tip has been thus accurately positioned on the shank, the assembled tool is removed from the tip locating fixture and the chip breaker tightened on the shank after which the tool is ready for use.

Applicant's method for holding the tip on the shank simplifies the changing of tools and makes it possible to grind and set the tool tip accurately and quickly. With applicant's improved means of holding and adjusting the tip on the shank it is possible to grind and set the tool in the grinding room so that when the tool is placed in the machine the parts produced will be within a tolerance of .001" without adjusting the tool block on the machine.

What I claim as new and desire to secure by Letters Patent of the United States is:

1. A chip controller and breaker having a hard metal plate adapted to curl a metal chip and a second hard metal plate adapted to break said chip, said plates forming with each other an angle greater than 90° but less than 180°, and means between one side of said controller and breaker and said plates whereby said controller and breaker may be secured to a cutting tool.

2. In combination, a tool comprising a shank and a cutting tip, said tip being mounted in a recess in said shank, a chip controller and breaker mounted on said shank and tip and having a hard metal face adapted to control the curling and breaking of a metal chip cut by said tip, one portion of said face being substantially at right angles with said shank, the remaining portion of said face forming an angle greater than 90° but less than 180° with said first mentioned portion.

3. In combination, a tool comprising a shank and a cutting tip, said tip being mounted in a recess in said shank, a chip controller and breaker mounted on said shank and tip and having a hard metal face adapted to control the curling and breaking of a metal chip cut by said tip, one portion of said face being substantially at right angles with the top surface of said shank said other portion forming an angle with the top surface of said tool tip and with said first mentioned portion, each of said angles being greater than 90° but materially less than 180°.

4. In combination, a tool comprising a shank and a cutting tip, a chip controller and breaker detachably mounted on said shank, said controller and breaker comprising two surfaces angularly disposed with respect to one another, one of said surfaces being adapted to engage and curl the chip and the other of said surfaces being adapted to break said chip, and means engaging said shank and chip controller and breaker and holding them against relative longitudinal movement while permitting relative movement of said tip and shank.

5. In combination, a tool comprising a shank and a cutting tip, a chip controller and breaker detachably mounted on said shank, said controller and breaker comprising two surfaces angularly disposed with respect to one another, one of said surfaces being adapted to engage and curl the chip and the other of said surfaces being adapted to break said chip, and means mounted on said shank and adapted to move said tip in a longitudinal direction without changing the relative position of said shank and chip controller and breaker.

6. In combination, a a tool comprising a shank and a cutting tip, a chip controller and breaker detachably mounted on said shank and tip, means engaging said chip controller and breaker and shank to prevent relative movement of the chip controller and breaker and shank, said controller and breaker comprising two surfaces angularly disposed with respect to one another, one of said surfaces being adapted to engage and curl the chip and the other of said surfaces being adapted to break said chip, and means mounted in said shank and adapted to move said tip in a longitudinal direction.

7. In combination, a tool comprising a shank and a cutting tip, a chip controller and breaker detachably mounted on said shank and tip, means engaging said chip controller and breaker and shank to prevent relative movement of the chip controller and breaker and shank, said chip controller and breaker comprising two surfaces angularly disposed with respect to one another, one of said surfaces being adapted to engage and curl the chip and the other of said surfaces being adapted to break said chip, and an adjustable pin mounted within said shank and engaging one end of said tip whereby said tip may be moved in a longitudinal direction on said shank.

NOBLE N. SHEPHERD.